E. T. KISSINGER.
INDICATOR FOR BALING PRESSES.
APPLICATION FILED MAR. 25, 1922.
1,431,587.
Patented Oct. 10, 1922.
2 SHEETS—SHEET 2.
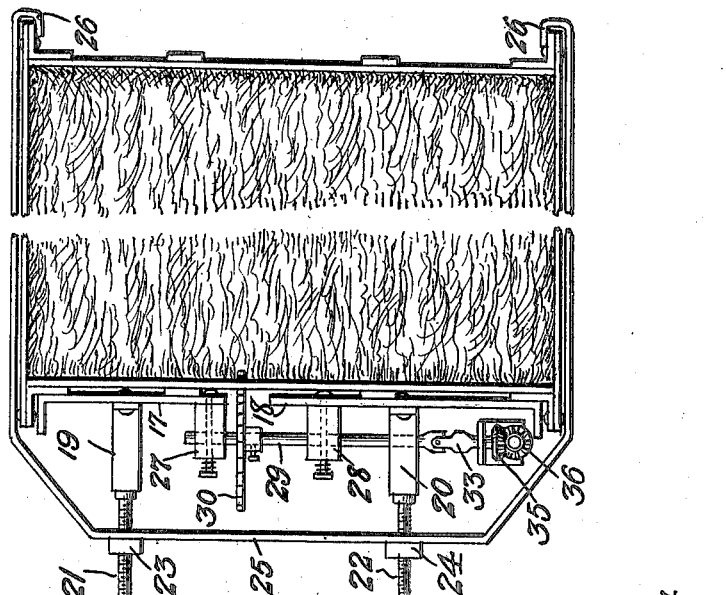
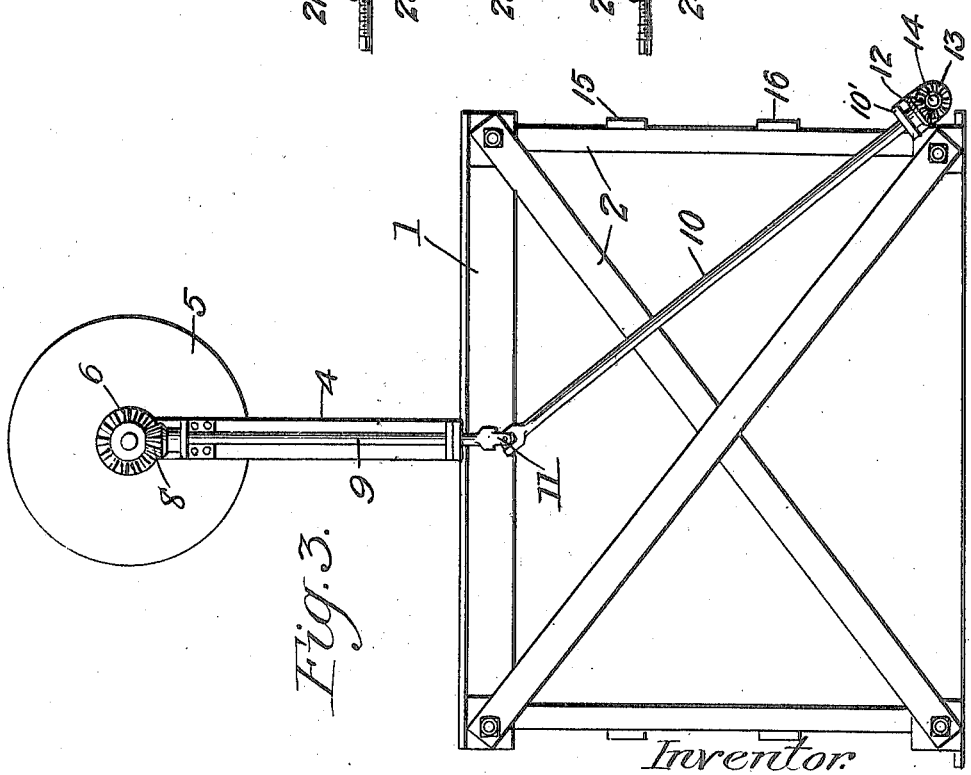
Inventor.
Elmer T. Kissinger,
by Chas. J. O'Neill, atty.

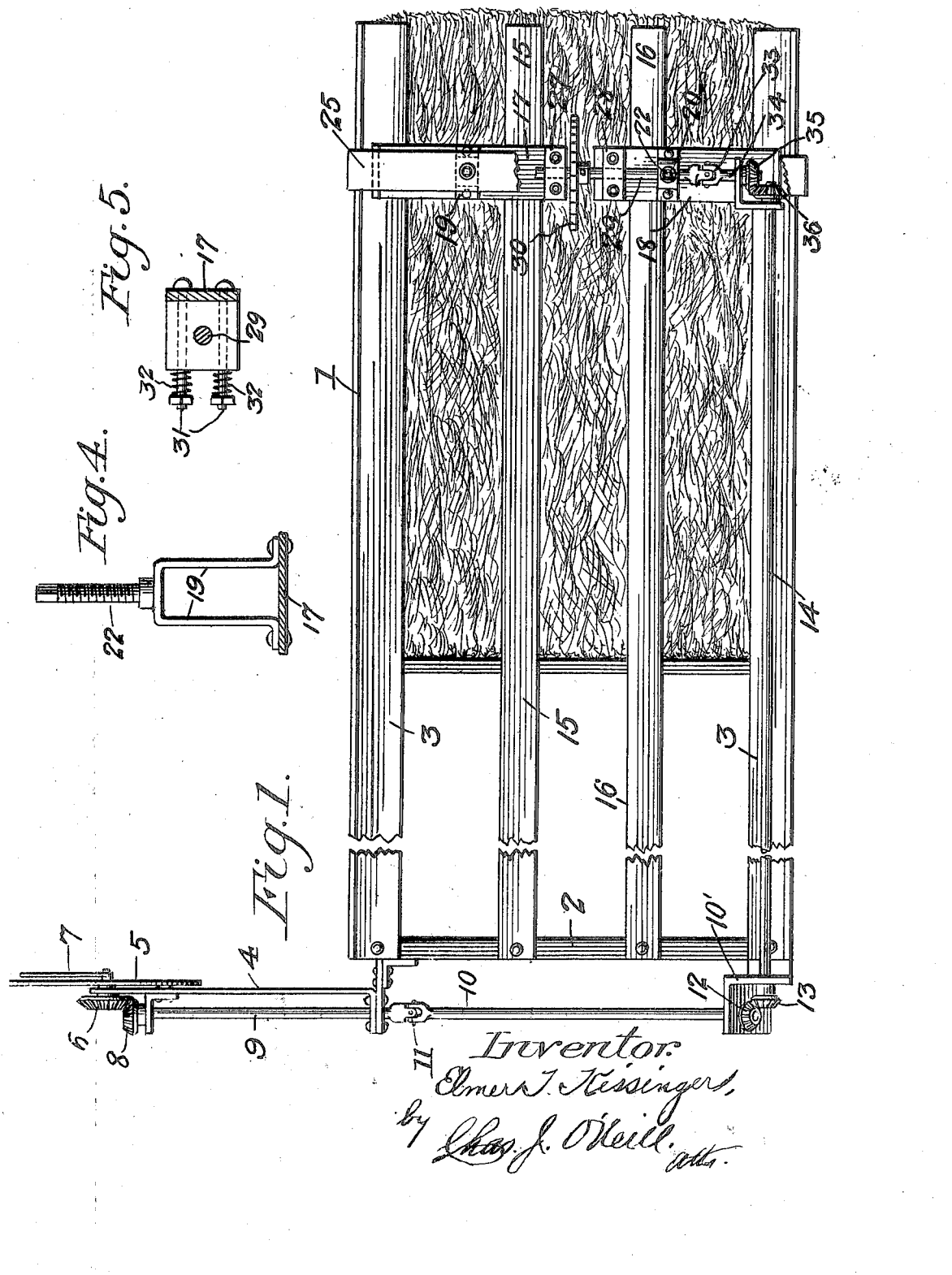

Patented Oct. 10, 1922.

1,431,587

UNITED STATES PATENT OFFICE.

ELMER T. KISSINGER, OF CRESTON, OHIO.

INDICATOR FOR BALING PRESSES.

Application filed March 25, 1922. Serial No. 546,730.

*To all whom it may concern:*

Be it known that I, ELMER T. KISSINGER, a citizen of the United States, residing at Creston, county of Wayne, State of Ohio, have invented certain new and useful Improvements in Indicators for Baling Presses; and I do hereby declare the following to be a full, clear, and exact description of the invention, such as will enable others skilled in the art to which it appertains to make and use the same.

This invention relates to certain improvements in indicators for baling presses, and particularly to the type involving the use of a tracer wheel maintained in engagement with the moving bale for transmitting the desired movements to an indicator upon the rotation of said tracer wheel. The principal object of the invention is the provision of a means for mounting the tracer wheel so that said tracer wheel will be maintained in contact with the bale at a point where the desired transverse tension can be exerted and maintained on the bale as it passes by said tracer wheel.

Another object is to so mount the tracer wheel, in connection with the tension device, that said tracer wheel will be capable of mechanical adjustment with reference to the bale, and will also have an automatic limited movement transversely of its axis independent of said first-mentioned adjustment, whereby the tracer wheel will be guarded against shocks or passing obstructions without interfering with the tension device or mechanical adjustment exerting the desired lateral pressure on the moving bale at that point.

The preferred embodiment of the invention is illustrated in the accompanying drawings, in which Fig. 1 is a side elevation partly broken away, illustrating the invention as applied to a conventional baling press;

Fig. 2 is a forward end view also partly broken away;

Fig. 3 is a front end view;

Fig. 4 is a detail view of one of the adjusting elements of the tracer wheel support;

Fig. 5 is a detail view of one of the automatic adjustable bearing blocks for the shaft of the tracer wheel.

Referring to the drawings in detail, 1 represents generally a conventional form of baling press, comprising an end frame section 2, and upper and lower longitudinal corner frame members 3, making up the rectangular frame-work of the baling press.

Appropriately mounted on the front end of the baling press 1, is a vertical standard 4 supporting a dial 5, and a beveled gear 6 concentrically positioned with respect to said dial. The gear 6 is provided with a stub shaft projecting through said dial and provided with an indicator hand 7. Meshing with the beveled gear 6 is a correspondingly beveled gear 8 supported upon a vertical shaft 9, which shaft in turn is connected to a diagonally disposed shaft section 10 by a universal joint 11. The lower end of the shaft 10 is mounted in a bracket 10' secured to the lower corner of the baling press 1. The extreme end of the shaft 10 projecting through bracket 10' is supplied with a beveled gear 12 meshing with a beveled gear 13 secured to the end of the horizontal shaft 14, running lengthwise of the baling press.

The mechanism above described is more or less conventional, and forms no part of the present invention but has been described and illustrated in order to show a complete apparatus.

Disposed longitudinally of the baling press 1 are two intermediate longitudinal members 15 and 16, the rear end of each member being secured to the end frame 2 and the forward ends thereof being substantially free and laterally adjustable in a manner to be hereinafter described. Secured to the free end of member 15 is a vertically disposed strap, or the like, 17, and similarly, the free end of the member 16 is secured to a strap 18, leaving an intervening space between the adjacent ends of the straps 17 and 18 to permit the proper operation or functioning of the tracer wheel to be more fully hereinafter referred to.

Secured to the middle portion of the strap 17 is a U-shaped tension adjustable member 19, and the strap 18 is likewise provided with a U-shaped tension adjustable member 20, said tension members having their outer ends terminating in screws 21 and 22 respectively, passing through threaded enlargements or nuts 23 and 24 respectively, secured to a clamping yoke or the like 25, passing over and beneath the frame of the baling press and anchored thereto at its free ends by hooked portions 26, as clearly shown in Fig. 2.

The adjacent ends of the straps 17 and 18 are provided with automatically adjustable bearing blocks 27 and 28 respectively, supporting the shaft 29 of the tracer wheel 30. These bearing blocks 27 and 28, which might be called snubbers, are each secured to their respective straps by a pair of bolts 31 carrying compression springs 32 interposed between the outer ends of the bolts and the outer face of the bearing blocks. These bearing blocks are slidably mounted on the bolts 31, whereby the tracer wheel mounted on the shaft 29 may automatically adjust itself during its rotation, to overcome any sudden shocks, or the like, due to passing obstructions in the bale.

By the use of the adjustable tension members 19 and 20, the desired lateral pressure can be exerted upon the bale at that point adjacent the tracer wheel, which mechanical adjustment also determines the relative normal position of the tracer wheel with respect to the passing bale, and by reason of the adjustable bearing blocks 27 and 28, any unusual pressure on the tracer wheel during the operation thereof is automatically taken care of without interfering or disturbing the mechanically adjusted tension mechanism. The rotary movement of the tracer wheel 30 is transmitted by way of its shaft 29, through universal joint 33, to a stub shaft 34 carrying a beveled gear 35 in mesh with a correspondingly beveled gear 36 secured on the rear end of the horizontal shaft 14, whereby the indicator mechanism above referred to will be operated and the proper readings noted on the dial 5.

Applicant is aware that it is not new to provide a tracer wheel for operating a dial in connection with baling presses, nor is it new broadly to resiliently mount the tracer wheel with respect to the bale, whereby the desired tension is provided, in order to hold the tracer wheel constantly in contact with the passing bale during the baling operation. In applicant's construction, however, the tracer wheel is normally held in contact with the bale by mechanical means, which mechanical means also exerts a lateral pressure capable of regulation, on the bale, and, in addition to the mechanical adjusting means, the tracer wheel is mounted thereon in such a manner as to be independently and automatically adjustable, in order to take care of any shocks exerted on said tracer wheel by obstructions or the like passing the same during the baling process.

What I claim is:

1. The combination with an indicator dial for a baling press, of an operating mechanism therefor, comprising a tracer wheel, operative connections between said tracer wheel and dial, means for mechanically adjusting the tracer wheel relative to the side of the baling press, and automatic resilient means for mounting said tracer wheel on said first-mentioned means.

2. The combination with an indicator dial for a baling press, of an operating mechanism therefor, comprising a tracer wheel, operative connections between said tracer wheel and dial, vertically disposed straps adapted to exert a pressure on the side of a bale passing through said press, said tracer wheel being mounted on said straps and projecting between the adjacent ends thereof in contact with said bale, and screw adjusting means associated with said straps for exerting the desired pressure on the bale and maintaining said tracer wheel in engagement therewith.

3. The combination with an indicator dial for a baling press, of an operating mechanism therefor, comprising a tracer wheel, operative connection between said tracer wheel and dial, vertically disposed straps adapted to exert a pressure on the side of a bale passing through said press, said tracer wheel being mounted on said straps and projecting between the adjacent ends thereof in contact with said bale, a yoke embracing the baling press having an intermediate portion overlying and spaced from said straps, pressure exerting members interposed between said intermediate portion and said straps, each having a threaded extension passing through a correspondingly threaded member carried by the intermediate portion of said yoke for applying the desired pressure on the bale and maintaining said tracer wheel in engagement therewith.

4. The combination with an indicator dial for a baling press, of an operating mechanism therefor, comprising a tracer wheel, operative connections between said tracer wheel and dial, vertically disposed straps adapted to exert a pressure on the side of a bale passing through said press, resiliently adjustable bearing blocks carried by the adjacent ends of said straps, said tracer wheel being journalled in said blocks in contact with said bale, a yoke embracing the baling press having an intermediate portion overlying and spaced from said straps, pressure exerting members interposed between said intermediate portion and said straps, each having a threaded extension passing through a correspondingly threaded member carried by the intermediate portion of said yoke for applying the desired pressure on the bale and maintaining said tracer wheel normally in engagement therewith.

In testimony whereof I affix my signature.

ELMER T. KISSINGER.